United States Patent
Pitter et al.

(10) Patent No.: US 9,247,167 B2
(45) Date of Patent: Jan. 26, 2016

(54) IMAGE SENSOR AND METHOD OF SENSING

(75) Inventors: Mark Pitter, Nottingham (GB); Mike Somekh, Nottingham (GB); Roger Light, Nottingham (GB); Nicholas Johnston, Nottingham (GB); Gil Bub, Oxford (GB)

(73) Assignee: ISIS INNOVATION LIMITED, Oxford (GB)

(*) Notice: Subject to any disclaimer, the term of this patent is extended or adjusted under 35 U.S.C. 154(b) by 132 days.

(21) Appl. No.: 13/811,724

(22) PCT Filed: Jul. 12, 2011

(86) PCT No.: PCT/GB2011/001051
§ 371 (c)(1),
(2), (4) Date: Apr. 5, 2013

(87) PCT Pub. No.: WO2012/013918
PCT Pub. Date: Feb. 2, 2012

(65) Prior Publication Data
US 2013/0182160 A1 Jul. 18, 2013

(30) Foreign Application Priority Data
Jul. 28, 2010 (GB) .................................. 1012631.6

(51) Int. Cl.
H04N 5/369 (2011.01)
H04N 5/343 (2011.01)
H04N 5/345 (2011.01)
H04N 5/353 (2011.01)
H04N 5/3745 (2011.01)

(52) U.S. Cl.
CPC ............... *H04N 5/369* (2013.01); *H04N 5/343* (2013.01); *H04N 5/3456* (2013.01); *H04N 5/353* (2013.01); *H04N 5/3745* (2013.01)

(58) Field of Classification Search
USPC ........................................ 250/208.1
See application file for complete search history.

(56) References Cited

U.S. PATENT DOCUMENTS

| | | | | |
|---|---|---|---|---|
| 5,912,857 A * | 6/1999 | Kim | .......................... | G11C 8/10 365/230.03 |
| 6,198,686 B1 * | 3/2001 | Takita | ...................... | G11C 8/08 326/105 |
| 6,243,319 B1 * | 6/2001 | Yokozeki | ............... | G11C 5/025 365/189.08 |

(Continued)

FOREIGN PATENT DOCUMENTS

| | | |
|---|---|---|
| EP | 1353499 | 10/2003 |
| WO | WO 99/09737 | 2/1999 |
| WO | WO 2008/138543 | 11/2008 |

OTHER PUBLICATIONS

Yadid-Pecht et al., "CMOS Active Pixel Sensor Star Tracker with Regional Electronic Shutter" IEEE Journal of Solid-State Circuits, vol. 32, No. 2, Feb. 1997, pp. 285-288.

(Continued)

*Primary Examiner* — Michael Osinski
(74) *Attorney, Agent, or Firm* — Knobbe Martens Olson & Bear LLP

(57) ABSTRACT

An image sensor has a plurality of pixels arranged in an array, a selection means for selecting individual pixels in the array, and a shutter means for transmitting a shutter signal to the pixels. The pixels are constructed and arranged to sense incident light only when both selected and in receipt of a shutter signal. The pixels in said array can thus be triggered individually to capture light at different times.

15 Claims, 5 Drawing Sheets

(56) References Cited

U.S. PATENT DOCUMENTS

| | | | | |
|---|---|---|---|---|
| 6,320,799 | B1* | 11/2001 | Miyazaki | G11C 29/846 365/185.2 |
| 6,369,853 | B1* | 4/2002 | Merrill et al. | 348/302 |
| 6,570,144 | B1* | 5/2003 | Lee et al. | 250/208.1 |
| 6,720,592 | B1 | 4/2004 | Kindt | |
| 6,999,374 | B2* | 2/2006 | Cho | H04N 3/155 348/E3.018 |
| 7,053,943 | B2* | 5/2006 | Kakumoto et al. | 348/260 |
| 7,106,377 | B2* | 9/2006 | Bean et al. | 348/364 |
| 7,268,815 | B1* | 9/2007 | Meynants | 348/294 |
| 7,889,256 | B2* | 2/2011 | Cho | 348/308 |
| 7,952,629 | B2* | 5/2011 | Cieslinski | 348/294 |
| 2005/0104985 | A1* | 5/2005 | Abe et al. | 348/308 |
| 2006/0203112 | A1* | 9/2006 | Aoki | 348/294 |
| 2008/0259195 | A1* | 10/2008 | Yoshida et al. | 348/308 |
| 2008/0298148 | A1* | 12/2008 | Nagata | G11C 8/08 365/201 |
| 2009/0086049 | A1* | 4/2009 | Fujita et al. | 348/222.1 |
| 2009/0251576 | A1* | 10/2009 | Hattori et al. | 348/294 |
| 2009/0303367 | A1* | 12/2009 | Sakaguchi | 348/308 |
| 2010/0134662 | A1* | 6/2010 | Bub | 348/266 |
| 2011/0013065 | A1* | 1/2011 | Shinohara | 348/302 |
| 2012/0008027 | A1* | 1/2012 | Makino et al. | 348/296 |
| 2013/0037900 | A1* | 2/2013 | Abe | 257/431 |
| 2013/0140442 | A1* | 6/2013 | Yanagita et al. | 250/214 A |
| 2014/0043509 | A1* | 2/2014 | Ui et al. | 348/297 |
| 2014/0284665 | A1* | 9/2014 | Abe | 257/239 |

OTHER PUBLICATIONS

Aw et al., "A 128×128-Pixel Standard-CMOS Image Sensor with Electronic Shutter" 1996 IEEE International Solid-State Circuits Conference, vol. 39, Feb. 1996, pp. 180-181.

International Search Report mailed on Nov. 22, 2011 in International Application No. PCT/GB2011/001051.

* cited by examiner

IMAGE SENSOR AND METHOD OF SENSING

RELATED APPLICATIONS

This application is the U.S. National Phase filing under 35 U.S.C. §371 of PCT/GB2011/001051, filed Jul. 12, 2011, which designated the United States and was published in English as WO 2012/013918 on Feb. 2, 2012, which claims priority under 35 U.S.C. §119(a)-(d) to Great Britain Patent Application No. 1012631.6, filed Jul. 28, 2010, the content of which is incorporated herein by reference in its entirety.

FIELD OF THE INVENTION

The present invention relates to an image sensor and to an image capture device. The invention also relates to a method of capturing images. In particular but not exclusively, the invention relates to a device and method for capturing both still and moving images (movies).

BACKGROUND OF THE INVENTION

Electronic cameras are generally divided into two broad categories: still cameras and video cameras. However, there is a degree of overlap between the two types of camera. For example, some "video" cameras are capable of capturing both movies and still images.

On the other hand, some still cameras are provided with a "movie" or "video" function, which allows the camera to capture a sequence of images. These images can subsequently be shown as a movie. This invention is concerned primarily (but not exclusively) with the latter type of camera.

Electronic cameras generally include an image capture device or sensor having an array of photosensitive detectors or picture elements (pixels). A moving image or movie can be captured by recording a sequence of images detected by the sensor.

The rate at which a sequence of images can be captured (the frame rate) depends in part on the size of the sensor (that is, the number of pixels in the array), and is limited by the rate at which data can be read (digitised) from the sensor. Reading information from an imaging sensor at high speed introduces noise (read noise), which lowers the signal quality of the image. Accordingly, if the sensor has a large number of pixels, the frame rate will generally be rather slow. Smaller sensors with fewer pixels may provide a higher frame rate, but the resolution of the image will be correspondingly reduced.

The inventor's previous patent application WO 2008/138543A describes an image capture device including a sensor with an active area comprising a plurality of pixels, and a shutter array comprising a plurality of shutter elements that can be activated individually to control the exposure of the individual pixels. The pixels are arranged in a number of pixel subsets that can be exposed sequentially to capture a sequence of lo-res images each comprising less than the full set of pixels, or simultaneously to capture a hi-res image comprising all or substantially all of the pixels. However, the provision of a separate shutter array adds to the size and complexity of the device.

It is an object of the present invention to provide an image sensor and a method of capturing images that mitigate at least some of the aforesaid disadvantages.

According to one aspect of the invention there is provided an image sensor having a plurality of pixels arranged in an array, a selection means for selecting individual pixels in the array, and shutter control means for transmitting a shutter signal to the pixels, wherein each said pixel is constructed and arranged to sense incident light only when both selected and in receipt of a shutter signal, whereby pixels in said array can be triggered individually to capture light at different times.

SUMMARY OF THE INVENTION

By triggering the pixels individually, it is possible to capture either a single hi-res image using all the pixels, or one or more lo-res images using fewer than all the pixels. The pixels can be triggered electronically, thus avoiding the need for a separate shutter array. The size and complexity of the device are thus significantly reduced.

Advantageously, the pixels are arranged in an array of rows and columns and are connected to receive a row select signal and a column select signal, whereby an individual pixel can be selected by transmitting a row select signal and a column select signal along the row and the column in which that pixel is located. This arrangement allows each pixel to be selected individually without the need for individual control lines. This therefore avoids excessive circuit complexity. The rows and columns may be either orthogonal or non-orthogonal.

Preferably, the selection means comprises a plurality of row selection lines and a plurality of column selection lines, wherein each row selection line is connected to all the pixels in a particular row and each column selection line is connected to all the pixels in a particular column. Thus it is possible to select all of the pixels individually using just two sets of control connections. The selection means preferably comprises a grid of row selection connections and column selection connections.

Advantageously, at least one of the row select signal and the column select signal is generated by a shift register. Preferably, both the row select signal and the column select signal are generated by shift registers. A shift register is an electronic device that can store a series of digital values and can shift that sequence backwards and forwards. This allows the pixels to be triggered in a predetermined sequence. The digital values held in the shift registers can also be modified very easily to change the sequence in which the pixels are triggered. This makes it possible to adjust the number of pixels exposed at any one time, and the order in which the pixels are exposed.

Advantageously, each pixel includes a control means for triggering the pixel, the control means being constructed and arranged to trigger the pixel only when it receives substantially simultaneously a shutter signal, a row select signal and a column select signal.

In one embodiment, the control means includes a logical AND gate having inputs for receiving a shutter signal, a row select signal and a column select signal.

In another embodiment, the control means includes a plurality of series-connected switch devices, each switch device being operably connected to receive at least one of a shutter signal, a row select signal and a column select signal. This arrangement is preferred in some situations to the use of an AND gate as it requires fewer transistors and therefore occupies less area on the surface of the sensor device. The switch devices may for example be transistor pass switches, for example MOSFET transistors.

The image sensor preferably comprises a CMOS APS device, in which each pixel includes a device for storing an electrical charge representing the amount of light falling on the pixel. This allows each pixel to store a charge representing the incident light until all of the pixels have been exposed, after which the data from all of the pixels can be captured. This increases the operational speed of the device.

According to another aspect, the invention comprises an image capture device including an image sensor according to any one of the preceding statements of invention and a data storage device for storing data from the pixels, said pixels being divided into a plurality of pixel subsets and said image capture device being constructed and arranged to capture a plurality of time-separated lo-res images, each said lo-res image comprising the data from a different pixel subset.

Advantageously, the image capture device is constructed and arranged to capture a hi-res image using data from all the pixels on the sensor to create a full frame, high resolution image.

The image capture device may include a control device for controlling operation of the pixel array, wherein the control device is constructed and arranged to trigger the pixels in a predefined, random or pseudo-random sequence.

According to another aspect, the invention comprises a camera that includes an image capture device according to any one of the preceding statements of invention. The camera preferably includes a lens for focussing light onto the active area of the sensor. The camera may also include a display device for displaying captured images, which is constructed and arranged to display either a single hi-res image or a sequence of lo-res images. Advantageously, the camera includes a control device for controlling the exposure of the pixel subsets.

According to another aspect of the invention there is provided a method of capturing images using an image sensor having a plurality of pixels arranged in an array, the method comprising selecting individual pixels in the array and transmitting a shutter signal to the pixels, whereby said pixels are triggered to sense incident light only when both selected and in receipt of a shutter signal.

Advantageously, the pixels in the array are triggered individually to capture light at different times.

Preferably, the pixels are arranged in an array of rows and columns and an individual pixel is selected by transmitting a row select signal and a column select signal along the row and the column in which that pixel is located.

Preferably, at least one of the row select signal and the column select signal is generated by a shift register.

Preferably, each pixel is triggered to sense incident light only when it receives substantially simultaneously a shutter signal, a row select signal and a column select signal.

Advantageously, the method includes capturing a plurality of time-separated lo-res images, each lo-res image comprising the data from a different one of a plurality of pixel subsets.

The pixel subsets are preferably exposed sequentially.

Advantageously, a hi-res image is generated by combining the data from a plurality of lo-res images.

The invention allows a set of time-separated low resolution ("lo-res") images to be embedded within each high resolution ("hi-res") image. The embedded lo-res images can then be viewed in sequence as a movie, or the data from all the pixels can be used to form a single hi-res image. Movies and still images can thus be captured simultaneously. The invention allows movies to be captured at much higher frame rates than can currently be achieved with existing sensor devices and, although the spatial resolution of the lo-res images is lower than that of the hi-res image, it is still sufficient for many purposes. The balance of resolution versus frame rate can be easily adjusted. Furthermore, the still images can be captured with no loss of spatial resolution and no significant increase in the data storage requirements of the device.

Certain embodiments of the invention will now be described by way of example with reference to the accompanying drawings, in which:

DETAILED DESCRIPTION OF THE PREFERRED EMBODIMENT

Figure 1:
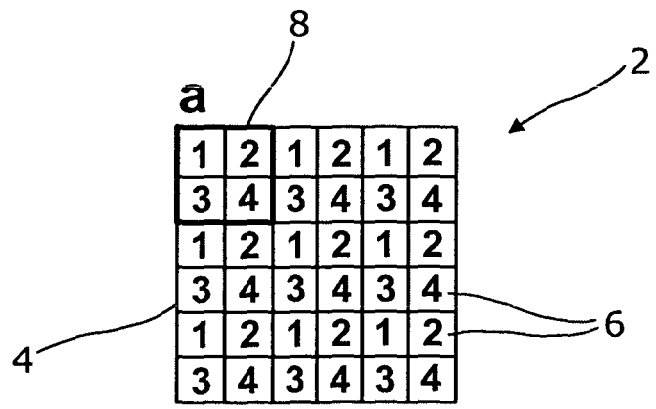
FIG. 1 is a front view showing schematically a small portion of an image sensor according to a first embodiment of the invention.
Figure 2:
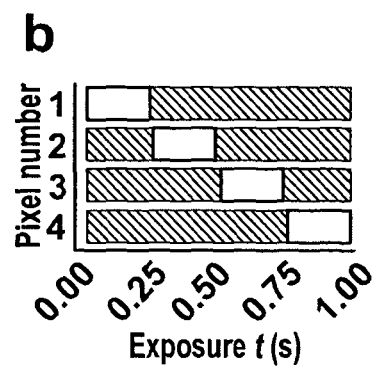
FIG. 2 is a chart illustrating shutter exposure times for respective shutter elements in the image capture device of FIG. 1.
Figure 3:
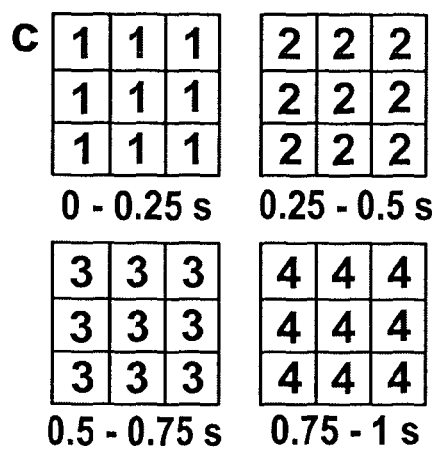
FIG. 3 illustrates how a sequence of images may be captured by the image sensor.

A portion of an image capture device according to a first embodiment of the invention is shown in FIGS. 1 to 3. The image capture device 2 includes a sensor 4 having an active area comprising a rectangular array of photosensitive picture elements (pixels) 6. The sensor 4 may for example be a CMOS APS device (a complementary metal-oxide semiconductor, active pixel sensor device), or equivalent.

For simplicity, the sensor 4 shown in FIG. 1 is very small having only thirty-six pixels arranged in six by six pixel square array. In most real sensors the pixel array will be much larger than this and may consist of several million pixels. The pixel array may also have a different aspect ratio and the pixels may be arranged in various different patterns.

More generally, the sensor 4 contains A pixels, which are divided into N subsets of pixels, which we will call subset $S_1$, subset $S_2$ ... subset $S_N$. Each subset contains A/N pixels. In the simple example shown in FIG. 1, the sensor has thirty-six pixels (A) and four subsets (N) of pixels, each subset containing nine pixels.

The pixels 6 of the different subsets $S_1$ to $S_N$ are grouped in a number of pixel groups 8, each pixel group 8 containing one pixel from each subset. In the example shown in FIG. 1, each pixel group 8 contains four pixels 6, which are arranged in a square with a pixel from subset $S_1$ in the top left corner, a pixel from subset $S_2$ in the top right corner, pixel from subset $S_3$ in the bottom left corner and pixel from subset $S_4$ in the bottom right corner. Therefore, in this example the sensor 4 comprises four pixel subsets $S_1$ to $S_4$ and nine pixel groups 8. The pixel groups 8 cover substantially the entire active surface of the sensor 4 and therefore each pixel subset $S_1$ to $S_N$ includes pixels from substantially the entire active area of the sensor 4.

The pixels 6 in each subset $S_1$ to $S_N$ are electronically linked so that all the pixels in any one subset can be triggered to capture the incident light substantially simultaneously, the exposure of the pixels being controlled by control electronics as described in more detail below. In this example, the four pixel subsets $S_1$ to $S_4$ are arranged to capture light sequentially as shown in FIG. 2. Thus, the pixels in pixel subset $S_1$ capture light for a first period 0.25 seconds, followed by the pixels in subset $S_2$ for the next period 0.25 seconds, then the pixels of subset $S_3$ for another 0.25 seconds and finally the pixels of subset $S_4$ for a fourth period of 0.25 seconds. The total integration time $T_i$ for all four pixel subsets $S_1$ to $S_4$ is therefore 1.0 second, the individual exposure time of each pixel being $T_i/N$ (in this example, 0.25 seconds).

During exposure, each pixel integrates the charge generated when photons strike its surface. After the set integration time $T_i$, the charge on all the pixels is digitised and the resulting digital image data is transferred from the sensor 4 to a memory device.

The stored image data may be displayed either as a moving image (a movie) comprising a sequence of successive images, or as a single still image. To display the image data as a movie, a separate image is created from the image data captured by each pixel subset. Thus, as illustrated in FIG. 3, a first image $I_1$ is created from the image data captured by all of the pixels in pixel subset $S_1$ and represents the light incident on the sensor during the first period of 0.25 seconds. Image $I_2$ is created from the image data captured by all the pixels in pixel subset $S_2$ and represents the light incident on the sensor during the second period of 0.25 seconds, and so on for images $I_3$ and $I_4$. The four images $I_1$ to $I_4$ are then displayed sequentially, as a four frame video sequence.

When generating the movie, the apparent location of each pixel in the displayed low resolution image may be shifted slightly to take account of the fact that the pixels of the different pixel subsets collect data from slightly different, but known, locations. In this example, each frame of the movie has an image size of nine pixels, which is one quarter of the resolution of the entire sensor. We refer to images that are generated using less than the full pixel set as low resolution ("lo-res") images to distinguish them from high resolution ("hi-res") images generated using substantially the full pixel set. More specifically, a lo-res image is normally generated using a fraction 1/N of the full pixel set, where N is an integer representing the number of pixel subsets.

If an extended video sequence is required, this image capture process may be repeated one or more times, with multiple data sets being captured at a rate of one data set every $T_i$ seconds, and the captured lo-res images can subsequently be displayed in sequence.

To display a still image, the data from all the pixels on the sensor is used to create a full frame, high resolution image. In this example, this will be a thirty-six pixel image.

Figure 4:
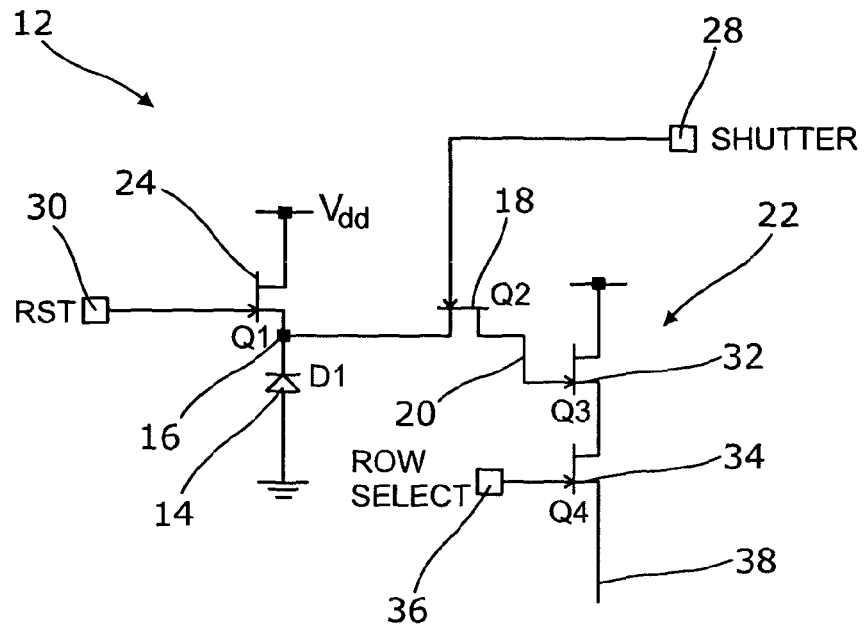
FIG. 4 is a circuit diagram of a conventional prior art pixel with a global shutter control.

A circuit diagram for a conventional prior art pixel 12 is shown in FIG. 4. A typical CMOS APS image sensor for a camera generally includes an array of such pixels. The pixel 12 includes a photosensor device 14, a transistor transfer switch 18, a readout circuit 22 and a transistor reset switch 24.

The photosensor device 14 comprises a photodetector, for example a photodiode or phototransistor. The photosensor device 14 provides an output signal at photosensor connection 16, which is represented by voltage $V_p$. This output signal is connected to a first terminal of the transistor transfer switch 18. A second terminal of the transfer switch 18 provides a readout connection 20 for a readout voltage $V_s$ and is connected to the readout circuit 22. The gate terminal of the transfer switch 18 is connected to receive a shutter signal from a shutter node 28. In this example, the transfer switch 18 is an n-channel MOSFET (metal oxide semiconductor field effect transistor), which only conducts when it receives an on signal from the shutter node 28.

The reset switch 24 comprises another MOSFET transistor. In this example, the source terminal of the reset switch 24 is connected to a fixed power supply voltage $V_{dd}$. The gate terminal of the reset switch 24 is connected to receive a reset signal from a reset node 30. The drain terminal is connected to the photosensor device 14 through photosensor connection 16.

The readout circuit 22 comprises a conventional selectable source-follower readout circuit, which includes a source-follower transistor 32, a select transistor 34 connected to receive a row select signal 36, and an output node 38 for an output signal $V_{out}$, which is connected to the source connection of the select transistor 34. The readout circuit 22 is designed to sense the voltage at the readout connection 20 of the transfer switch 18. The gate of the select transistor 34 is connected to receive a select signal from a row select node 36 that selects which pixel in a column of pixels is connected to the output node 38.

In use, a reset signal is applied through the reset node 30 to the gate of the transistor reset switch 24, thus causing the reset switch 24 to conduct. The reset switch 24 applies a high voltage $V_{dd}$ to the photosensor 14, which stores a charge owing to the intrinsic capacitance of the circuit components. Having reset the pixel, the reset signal then turns off.

In order to sense the intensity of the light falling on the pixel, an on signal is applied via the shutter node 28 to the gate of the transfer switch 18. This allows the stored charge to discharge through the photodetector 14. The rate at which the charge discharges depends on the photocurrent $I_p$ through the photodetector 14, which in turn depends on the intensity of light incident on the photodetector. The voltage $V_p$ at photosensor connection 16 thus decreases at a rate that depends on the intensity of light falling on the photosensor 14.

The photosensor 14 thus provides an output signal $V_p$ at photosensor connection 16 that is proportional to a time integral of the detected light. This output signal $V_p$ is applied to the input of the readout circuit 22 via transfer switch 18 and the readout connection 20.

At the end of a predetermined exposure time, the shutter signal goes off thus disconnecting the photosensor 14 from the readout circuit 22. The readout circuit stores the output signal $V_p$ at the moment of disconnection. The readout circuit 22 is thus isolated from the photosensor at a capture moment that is determined by the timing of the off shutter signal. The readout circuit 22 samples the photosensor signal $V_p$ at the capture moment and provides a read out signal at output node 38. The exposure time is thus determined by the duration of the on shutter signal.

Conventionally, the on shutter signal is delivered simultaneously to all the pixels in the array. Therefore, all the pixels operate to sense the incident light simultaneously. The output signals from the pixels are then fed to an electronic processor (not shown), which digitises the signals and combines them to form a hi-res image file.

Figure 5:
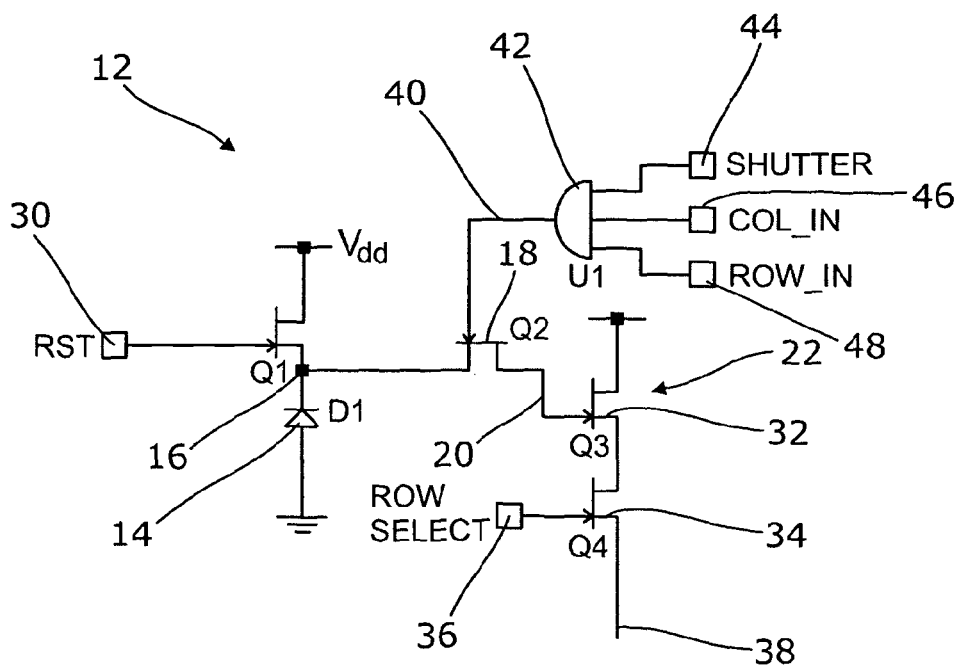
FIG. 5 is a circuit diagram of a pixel according to a first embodiment of the invention, with an individual pixel-level shutter control.

A modified pixel circuit according to a first embodiment of the invention is shown in FIG. 5. This pixel circuit 12 is similar in most respects to the conventional pixel shown in FIG. 4 and includes a photosensor device 14, a MOSFET transistor transfer switch 18, a readout circuit 22 and a transistor reset switch 24. The photodetector 14, which may for example be a photodiode or phototransistor, provides an output signal at a photosensor connection 16. This output signal is connected to a first terminal of the transistor transfer switch 18. The second terminal of the transfer switch 18 provides a readout connection 20 for a readout voltage $V_s$ and is connected to the readout circuit 22.

The reset switch 24 comprises another MOSFET transistor. The source terminal of the reset switch 24 is connected to a fixed power supply voltage $V_{dd}$ and the gate terminal of the reset switch 24 is connected to receive a reset signal through reset node 30. The drain terminal is connected to the photosensor device 14 through photosensor connection 16.

The readout circuit 22 comprises a conventional selectable source-follower readout circuit, which includes a source-follower transistor 32, a select transistor 34 connected to receive a row select signal through row select node 36, and an output node 38 for an output signal $V_{out}$, which is connected to the source connection of the select transistor 34. The readout circuit 22 is designed to sense the voltage $V_s$ at the readout connection 20 of the transfer switch 18 without drawing any current from the output. The gate of the select transistor 34 is connected to receive a select signal through row select node 36 that selects which pixel in a column of pixels is connected to the output node 38.

The gate terminal of the transfer switch 18 is connected to receive a control signal from the output connection 40 of a logical AND gate 42. The AND gate 42 has three inputs which are connected to a shutter node 44, a column select node 46 and a row select node 48 through which they receive respectively a shutter signal, a column select signal and a row select signal. The AND gate 42 provides an on control signal at output connection 40 only when all three input signals are on. If one or more of the input signals is off the control signal provided at the output connection 40 of the AND gate 42 will be off.

As previously indicated, the transfer switch 18 only conducts when it receives an on signal at the gate terminal of the switch. Therefore, owing to operation of the AND gate 42 it only conducts when all three of the inputs of the AND gate 42 are on. That is, the transfer switch 18 only conducts when the shutter signal, the column select signal and the row select signal are all on. Therefore, operation of the pixel can be controlled by applying on and off signals to the column select node 46, the row select node 48 and the shutter node 44. This allows each pixel in the pixel array to be activated individually, and makes it possible to capture a sequence of time-dependent lo-res image files as described above.

These lo-res images can then be viewed separately in sequence as a movie or they can be combined to form a single hi-res still image.

Figure 6:
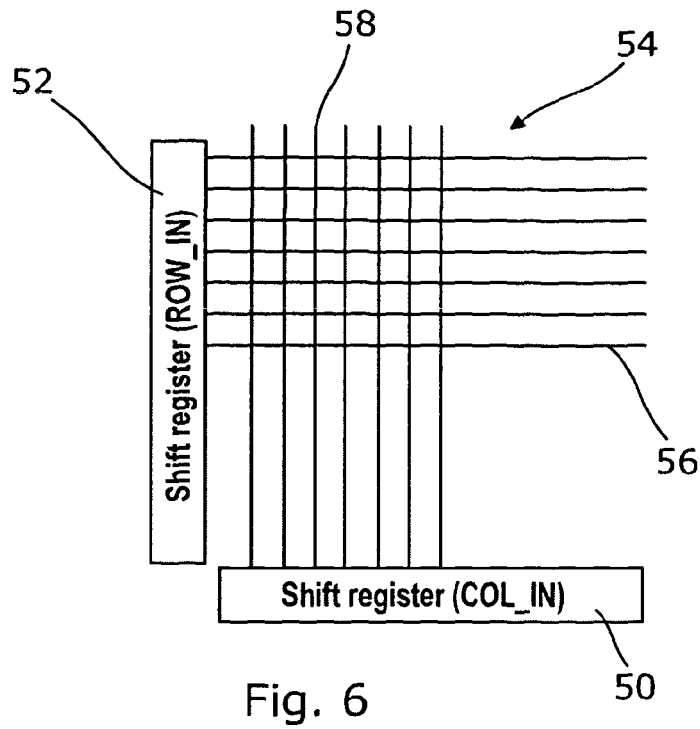
FIG. 6 illustrates a control circuit for a pixel according to an embodiment of the invention.

An example of a control circuit for controlling operation of the individual pixels in a pixel array is illustrated schematically in FIG. 6. In this example, the column and row select signals are generated by a column select shift register 50 and a row select shift register 52, which are connected to a grid of control connection lines 54. Each row connection line 56 is connected to the row select nodes 48 of all the pixels in a single row of pixels, and each column connection line 58 is connected to the column select nodes of all the pixels in a single column of pixels. Every pixel in the pixel array is therefore connected via a single row connection line 56 and a single column connection line 58 to the shift registers 50, 52.

Each shift register 50,52 stores a set of on and off signals, which are applied via the grid 54 of connection lines to the pixels in the pixel array. The shutter nodes 44 are connected to a common shutter connection (not shown) so that they all receive a shutter signal at the same instant.

In use, the pixels are controlled by the signals received at the shutter node 44, the column select node 46 and the row select node 48. Owing to operation of the logical AND gate 42, each pixel senses light only when all three signals are on. Therefore, by controlling the column select and row select signals delivered to the column select and row select nodes 46,48 the operation of the individual pixels can be controlled.

Figure 7:
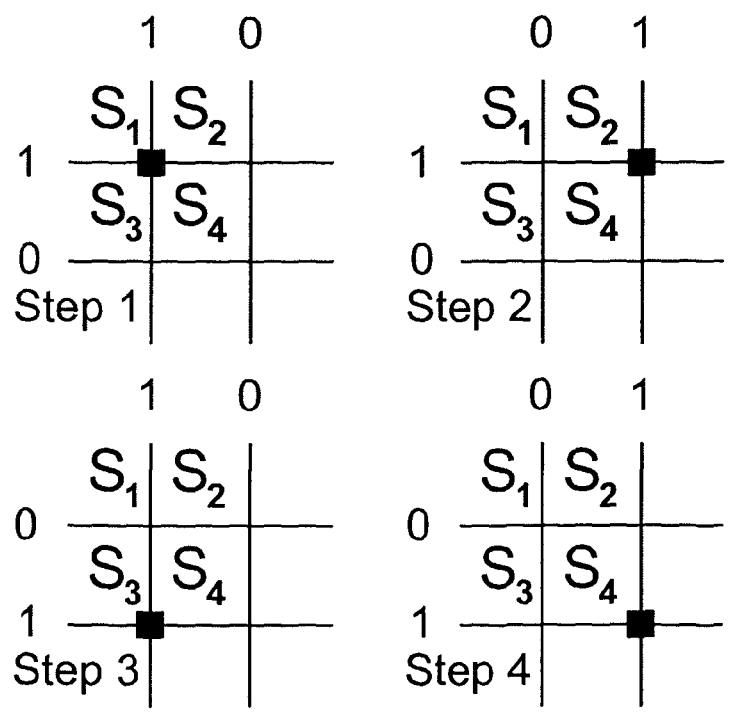
FIG. 7 illustrates schematically operation of the control circuit.

An example of a typical control sequence for a simple 2×2 four-pixel sub-group is illustrated in FIG. 7. In this example, the column select shift register 50 and the row select shift register 52 each store a set of alternating control signals in the form 1, 0, 1, 0, 1, 0, . . . , where "1" is on and "0" is off. In the first step, the row1 and column1 signals are on and the row2 and column2 signals are off. The pixel in subset $S_1$ is therefore on and the pixels in subsets $S_2$, $S_3$ and $S_4$ are off. In the second step, the column select shift register 50 has advanced one step so that the sequence of alternating control signals is now 0, 1, 0, 1, 0, 1, . . . , whereas and the row select shift register 52 has not advanced. As a result, the pixel in subset $S_2$ is now on and the pixels in subsets $S_1$, $S_3$ and $S_4$ are off.

In the third step, the column select shift register 50 and the row select shift register 52 have both advanced one step so that the pixel in subset $S_3$ is now on, and in the fourth step, only the column select shift register 50 has advanced one step so that the pixel in subset $S_4$ is now on. In the next step, the column select shift register 50 and the row select shift register 52 both advance one step to take the sensor back to the situation illustrated as step 1.

As another example, in a control sequence for a 4×4 sixteen-pixel sub-group, each shift register can store a control sequence in the form 1,0,0,0,1,0,0,0, etc. When this control sequence is applied to the pixels in the array only one pixel in each group will be activated. By advancing the row select control register three times, the other three pixels in the same column will be activated in turn. The row select and column select registers can then both be advanced one step to activate the first pixel in the next column, and so on to activate each of the other pixels in the pixel sub-group.

Many other control sequences are of course possible. It is not essential that the pixels are activated in a regular pattern as described above. In fact, in some situations it may be advantageous to activate the pixels in a pseudo-random sequence, which can be achieved by varying the control sequences stored in the shift registers or by advancing the registers in different patterns, including single or multiple steps, either forwards or backwards.

Figure 8:
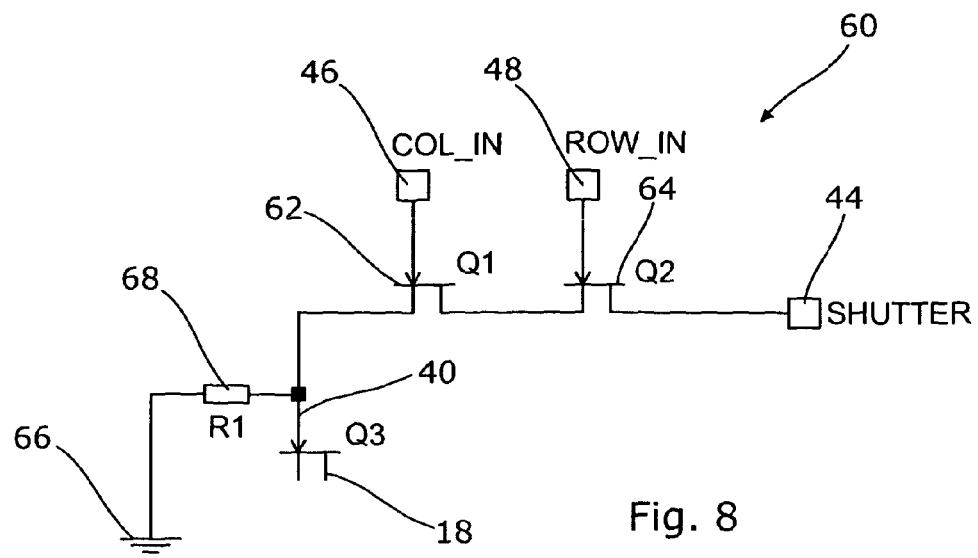
FIG. 8 is a circuit diagram of a pixel according to a second embodiment of the invention, with an individual pixel-level shutter control.

Part of a modified pixel circuit according to a second embodiment of the invention is shown in FIG. 8. This pixel circuit is similar to the pixel circuit shown in FIG. 5, except that the AND gate 42 is replaced by a control circuit 60, which is described in more detail below. One advantage of this pixel circuit over the previous circuit shown in FIG. 5 is that it requires fewer transistors and is more compact (the AND gate being a relatively large component), thus allowing more pixels to be provided on the sensor per unit area.

The modified pixel circuit depicted in FIG. 8 includes a photosensor device, a MOSFET transistor transfer switch 18, a readout circuit and a transistor reset switch. However, for the sake of clarity only the transfer switch 18 is shown in FIG. 8, the other components of the circuit being exactly as shown in FIG. 5.

The gate terminal 40 of the transfer switch 18 is connected to receive a control signal from the control circuit 60. The control circuit 60 includes two series-connected MOSFET control transistors 62,64 and the gate terminals of those transistors are connected respectively to a column select node 46 and a row select node 48 to receive in use a column select signal and a row select signal. The shutter node 44 is connected to the gate terminal 40 of the transfer switch 18 via the two control transistors 62,64. The shutter on signal can therefore only be delivered to the gate of the transfer transistor 18 when both the column select signal and the row select signal are also on. The gate terminal 40 of the transfer switch 18 is tied to a ground connection 66 via a resistor 68, to ensure that the transfer switch 18 remains off when no on signal is received from the control circuit 60.

In operation, the control circuit 60 provides an on control signal at output connection 40 only when all three input signals are on. Therefore, the transfer switch 18 will only conduct when the shutter signal, the column select signal and the row select signal are all on. Operation of the pixel can be controlled by applying on and off signals to the column select node 46 and the row select node 48, and by applying the shutter signal to the shutter node 44. This allows each pixel in the pixel array to be activated individually, and makes it possible to capture a sequence of time-dependent lo-res image files as described above. These lo-res images can then be viewed separately in sequence or they the data from all the pixels can be combined used to form a single hi-res image.

Figure 9:
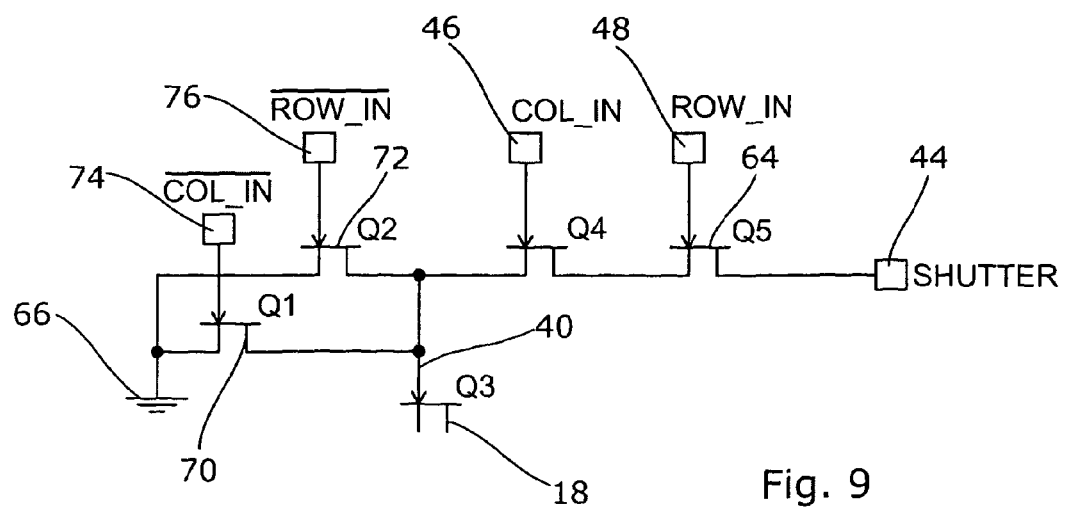
FIG. 9 is a circuit diagram of a pixel according to a third embodiment of the invention, with an individual pixel-level shutter control.

Part of another modified pixel circuit according to a third embodiment of the invention is shown in FIG. 9. This pixel circuit is similar to the pixel circuit shown in FIG. 8, except that instead of the resistor 68, the control circuit 60 includes two additional MOSFET transistors 70,72 that are connected in parallel between the gate terminal 40 of the transfer transistor 18 and the ground connection 66. The gate terminals of these additional transistors are connected respectively to nodes 74,76 that receive in use inverted column select and row select signals. The purpose of these additional transistors 70,72 is to hold the transfer transistor 18 in an off condition when either or both of the column select and row select signals is off.

The location of pixels in each subset does not have to follow a regular pattern as shown in FIG. 1. An apparently random location within the pixel group can be chosen by implementing a numerical scheme, which uses a random number generator with a user supplied seed value and shuffles the location of each pixel within the pixel group. A randomized scheme has two advantages. First, the location of each pixel in the low-resolution image is randomly assigned, even though the average distance between the pixels is the same. The advantages of having randomly distributed pixels vs. a regular under-sampled array for image reconstruction is well explained in U.S. Pat. No. 4,574,311, Random Array Sensing Devices, Resnikoff, Poggio, and Sims. Second, the low-resolution image sequence can only be recovered if the shuffled sequence of integers giving the correct timing is known. If the shuffled sequence is generated by an algorithm that incorporates a random number generating algorithm which is given a key, then the image sequence can only be recovered if the key is supplied by the person viewing the image sequence. This allows image sequences to be encrypted and protected from unauthorized viewing.

As an alternative to the rectangular geometry as shown in FIG. 1, pixel groups can have irregular polygonal shapes. Pixel groups can therefore cover regions of interest exactly, while excluding unnecessary pixels. An example of a possible use is in the life sciences, where a user may wish to monitor the activity of a small number of cells in a microscopic field of view. The user can draw a polygonal shape around the cells of interest, and an algorithm can divide the pixels within these shapes into groups which will be exposed at different times.

If the subject imaged by the sensor was moving during the exposure time, the image may contain some "motion blur". The amount of motion blur will generally be greater than with a conventional still camera sensor in which all the pixels are exposed simultaneously, since the total integration time is greater than the exposure time of the individual pixels. However, for subjects having little or no movement, the image quality will be substantially equal to that of a conventional sensor.

Alternatively, it may be possible to select various different image capture modes, such as a "movie/still" mode in which the pixel elements are actuated sequentially as described above, or a "still-only" mode in which all the pixel elements operate simultaneously. In movie/still mode the captured los-res images can be viewed either sequentially as a movie, or together as a hi-res still image (possibly with some motion blur). In still-only mode the motion blur will be equivalent to that of a conventional sensor, but because a set of time-separated lo-res images will not then be captured the possibility of viewing the images sequentially as a movie will not be available.

Alternatively, a set number of pixels can be used to obtain a blur free high res. image, while the remainder can be used for obtaining a series of low res. images as previously described. The number of pixels for the high res. low blur image can be selected by the user in order to ensure the desired picture quality. For example, 50% of the pixels can be devoted to create a high resolution blur free image, where the pixels of this subgroup are distributed over the entire array. These pixels would be exposed simultaneously, for a short time equal to the optimal exposure time for a blur free image set by the user. The remaining pixels would be divided into N−1 groups as before, and exposed sequentially to generate a movie sequence. The distribution of the pixels in the high resolution group can be regular (for example, every second pixel), or the pixels can be randomly distributed, or pseudo randomly distributed (so that the average density over a defined sub area of pixels is constant, but individual pixels within that area are chosen using a known random distribution). Missing pixels in the high resolution image can be compensated for by using any of a variety of available signal processing techniques. The advantages of having randomly distributed pixels vs. a regular under-sampled array for image reconstruction is well explained in U.S. Pat. No. 4,574,311, Random Array Sensing Devices, Resnikoff, Poggio, and Sims.

A practical example will now be described in which the invention is implemented in a digital SLR camera having an 8.2 megapixel sensor with dimensions of 2340×3500 pixels. An equivalent conventional camera is currently available, which is capable of capturing full frame images at a rate of five frames per second. If the present invention were implemented in that camera it could for example capture ten 0.82 megapixel lo-res images within each full frame image. Those lo-res images could then be viewed sequentially in movie mode at a rate of fifty frames per second, and a frame size of 738×1108 pixels. Alternatively, data from the full set of pixels can be used to create a high resolution 8.2 megapixel still image.

It will of course be apparent that by embedding more low resolution images within each full frame image even higher frame rates can be obtained. Alternatively, if a lower frame rate is adequate, a higher resolution movie can be captured.

In the process described above, the interval between the successive exposures used to create the embedded lo-res images is equal to the duration of the individual exposures. The next exposure therefore starts as the previous one ends, and the total integration time Ti is equal to Nt, where N is the number of pixel subsets and t is the exposure time for the individual pixels. Alternatively, the interval between the exposures and the exposure time may be adjusted so that the exposure times overlap or are spaced apart. This would allow the user to compensate for motion blur or low light conditions. For example, instead of using exposure times of 0.25 seconds as illustrated in FIG. 2, the exposure time may be reduced to 0.15 seconds. The exposure timings of the individual pixel subsets may be as follows: pixel subset 1 from 0 to 0.15 seconds, pixel subset 2 from 0.25 to 0.4 seconds, pixel subset 3 from 0.5 to 0.65 seconds and pixel subset 4 from 0.75 to 0.9 seconds. The total integration time will then be less than Nt.

As another example, the exposure time can be increased to 0.4 seconds, the individual exposure timings then being as follows: pixel subset 1 from 0 to 0.4 seconds, pixel subset 2 from 0.25 to 0.65 seconds, pixel subset 3 from 0.5 to 0.9 seconds and pixel subset 4 from 0.75 to 1.15 seconds. In this case pixel subset exposures overlap (1 overlaps with 2, 2 overlaps with 3, 3 overlaps with 4 and 4 overlaps with 1). The exposure interval may therefore be optimised according to the speed at which the subject is changing or moving.

Various applications of the invention are envisaged. Some of these will now be described.

Consumer Cameras

The invention may be implemented within a camera that is intended primarily for capturing still images, to provide the possibility of capturing movies at a relatively high resolution and frame rate. For example, as indicated above, a camera that can take a sequence of 8.2 megapixel images at a rate of five frames per second would be capable of providing a movie sequence of 0.8 megapixel images at a frame rate of fifty frames per second.

An advantage to the consumer is that the original high resolution photographs are conserved, and the data storage requirement (image size in memory) is the same as a conventional digital camera. Applications may include video acquisition and security camera operation, allowing the simultaneous capture of high resolution images for scene detail and low resolution image sequences.

Figure 10:
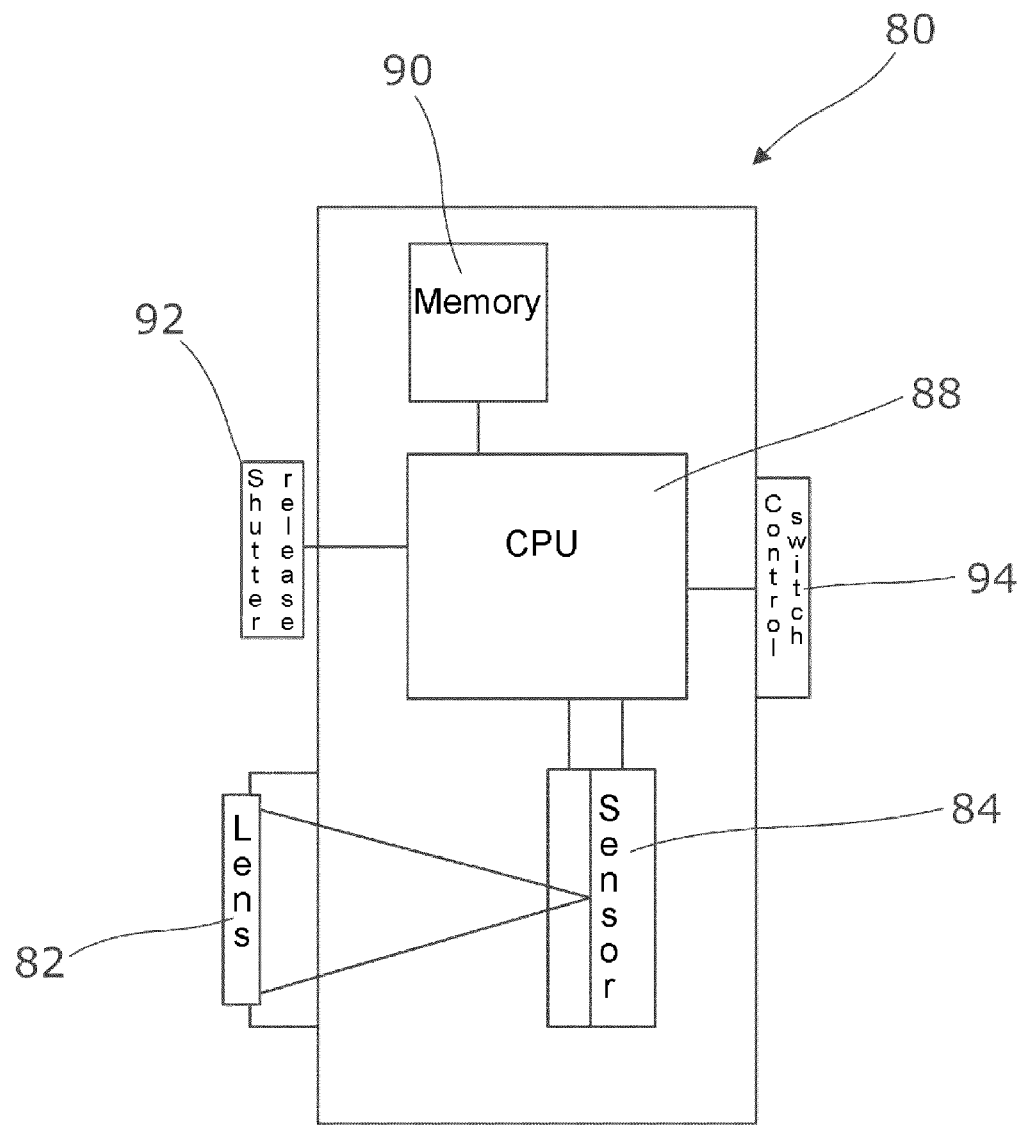
FIG. 10 is a schematic diagram illustrating the main components of a camera that includes an image sensor according to the invention.

The basic elements of a camera are illustrated schematically in FIG. 10. This camera 80 includes a lens 82 that focuses an image onto a CMOS sensor 84. Exposure of the individual pixels forming the sensor 84 to the incident light is controlled by a central processor unit (CPU) 88, which also reads data from the sensor. This data is stored in a memory device 90, for example a flash memory card. The camera includes a shutter release 92 and a control switch 94 that is linked to the CPU 88 and may be used to set, for example, the operational mode of the camera. The operation modes may for example include a "movie/still" mode in which the camera captures a set of time-separated lo-res images within each hi-res frame that may be viewed either as a movie or a high resolution still image, or a "still-only" mode in which the pixels are all exposed simultaneously to form a still image with minimal motion blur. The camera may also include other conventional features, such as a viewfinder, a display unit for checking settings or viewing captured images, lens controls for controlling the aperture, focal length and focussing of the lens 82, a flash unit, a data output port and so on.

Security/Machine Vision

Cameras that are used to monitor a changing 3D scene, which are common in surveillance applications and robotics/machine vision, must contend with several challenges. One issue is that if an object moves relative to the camera, the magnitude of movement of the image across the sensor will be inversely proportional to the distance of the object from the camera. This will cause motion blur to be more pronounced for objects close to the camera, obscuring necessary detail. For example, surveillance of a group of walking people on a street or in a building lobby would produce blurred images of their faces if they are close to the camera. Decreasing the shutter time for the whole image would potentially degrade image quality for objects far from the camera, as the total light collected from far objects will be less.

The present invention can address this issue by varying the number of pixel groups (and hence the temporal and spatial resolution as well as total exposure time) within one frame, so as to optimise imaging of several objects within the scene. Advantageously, objects closer to the camera are proportionately larger, reducing the spatial resolution requirements and allowing for increased temporal resolution. The size of the pixel groups can be chosen using a priori knowledge of the scene (for example, vehicles monitored travelling on a highway by an elevated camera facing the direction of traffic flow would become proportionately smaller toward the top of the image, allowing the use of a gradation of pixel group sizes to maintain the average number of pixels per car). Alternatively, the size of the pixel groups can be chosen dynamically using algorithmic methods (for example, by obtaining the optical flow from motion blur in a static image, as described in Berthold and Shunck, "Determining Optical Flow", Technical Report, MIT, 1980) or range finding equipment (e.g. laser range finders or similar).

Additionally, specific regions of interest can be imaged at different resolutions independent of the pixel group pattern used in the majority of the image. For example, a camera monitoring traffic could obtain high spatial resolution images of the license plates of vehicles by controlling the exposure time of an appropriately chosen rectangle of pixels, while monitoring vehicle motion with low spatial resolution.

Vehicle speed and license plate detection could be accomplished without a radar device in such a system by using the camera to continuously monitor vehicle motion at low spatial resolution (using sufficiently large pixel groups). A computer algorithm would calculate vehicle speed and dynamically change the pixel groups to image either the whole scene or just the license plates at high spatial resolution when required.

What is claimed is:

1. An image sensor comprised of a plurality of pixels arranged in an array of rows and columns, selection means providing row select and column select signals for selecting individual pixels in the array by transmitting a row select signal and a column select signal along the row and the column in which the selected pixel is located, and shutter control means for transmitting a shutter signal to the pixels, wherein each said pixels includes a photosensor device, a readout circuit, a transfer switch connected between the photosensor device and the readout circuit, and a control means for triggering the pixel, the control means including a logical AND gate having inputs connected to receive the shutter signal the row select signal and the column select signal, wherein the control means is connected to the transfer switch to control switching thereof, whereby the pixel senses incident light only when the control means receives substantially simultaneously the shutter signal, the row select signal and the column select signal, whereby pixels in said array are triggered individually to capture light at different times.

2. The image sensor according to claim 1, wherein the selection means comprises a plurality of row selection lines and a plurality of column selection lines, wherein each row selection line is connected to all the pixels in a particular row and each column selection line is connected to all the pixels in a particular column.

3. The image sensor according to claim 2, wherein the selection means comprises a grid of row selection lines and column selection lines.

4. The image sensor according claim 1, wherein at least one of the row select signal and the column select signal is generated by a shift register.

5. The image sensor according to claim 1, the image sensor comprising a CMOS APS device.

6. An image capture device including the image sensor according to claim 1, and a data storage device for storing data from the pixels, said pixels being divided into a plurality of pixel subsets wherein said image capture device captures a plurality of time-separated lo-res images, each said lo-res image comprising the data from a different pixel subset.

7. The image capture device according to claim 6, wherein said image capture device captures a hi-res image by using data from all the pixels.

8. The image capture device according to claim 6, further including a control device for controlling operation of the pixel array, wherein the control triggers the pixels in a predefined, random or pseudo-random sequence.

9. A camera including the image capture device according to claim 6.

10. A method of capturing images using the image sensor according to claim 1, the method comprising selecting individual pixels in the array by transmitting a row select signal and a column select signal along the row and the column in which the selected pixel is located, and transmitting a shutter signal to the pixels, whereby each of said pixels is triggered to sense incident light only when the control means receives substantially simultaneously the shutter signal, the row select signal and the column select signal.

11. The method according to claim 10, wherein the pixels in the array are triggered individually to capture light at different times.

12. The method according to claim 10, wherein at least one of the row select signal and the column select signal is generated by a shift register.

13. The method according to claim 10, further including capturing a plurality of time-separated lo-res images, each lo-res image comprising the data from a different one of a plurality of pixel subsets.

14. The method according to claim 13, further including exposing the pixel subsets sequentially.

15. The method according to claim 13, including creating a hi-res image by using data from all the pixels.

* * * * *